_United States Patent_ [19]

Wiesman

[11] 4,196,247

[45] Apr. 1, 1980

[54] PACKAGING MATERIAL HAVING NON-BLOCKING COATING

[75] Inventor: Dale C. Wiesman, Neenah, Wis.

[73] Assignee: American Can Company, Greenwich, Conn.

[21] Appl. No.: 897,008

[22] Filed: Apr. 17, 1978

[51] Int. Cl.$^2$ .......................... B32B 7/02; B32B 9/04; B65D 85/72

[52] U.S. Cl. ................................... 428/216; 428/484; 428/486; 428/467; 428/497; 428/514; 428/516; 428/518; 427/416; 427/412.2

[58] Field of Search ............... 428/484, 486, 216, 514, 428/467, 497

[56] References Cited

U.S. PATENT DOCUMENTS

| | | | |
|---|---|---|---|
| 3,305,383 | 2/1967 | Gordy | 428/485 |
| 3,394,096 | 7/1968 | Harvey | 428/486 X |
| 4,107,380 | 8/1978 | Wiesman | 428/485 X |

FOREIGN PATENT DOCUMENTS 1163653  2/1964  Fed. Rep. of Germany ........... 428/486

*Primary Examiner*—P. C. Ives
*Attorney, Agent, or Firm*—Robert P. Auber; Ira S. Dorman; George P. Ziehmer

[57] ABSTRACT

A flexible heat sealable packaging material including a flexible web of substrate material, a normally tacky heat sealable wax composition on the surface of the substrate, and a non-blocking coating applied as a hot melt over the heat sealable layer which has good release properties with respect to itself and to the non-coated side of the substrate. The non-blocking coating melts at the heat sealing temperatures to allow the underlying heat sealable material to pass therethrough and complete the seal.

10 Claims, No Drawings

PACKAGING MATERIAL HAVING NON-BLOCKING COATING

BACKGROUND OF THE INVENTION

1. Field of the Invention

This invention pertains generally to the field of heat sealable packaging material and particularly to such material having a heat sealable coating thereon.

2. Description of the Prior Art

Food products are often wrapped in sealed packages in order to preserve the freshness of the product. Some packaging materials, such as low melting point thermoplastic polymers, can be sealed to themselves by heat sealing techniques. Other materials such as paper, cellophane, and metal foils cannot be heat sealed and therefore must be sealed either by the use of adhesives or by heat sealable compositions applied to a surface of the wrapping material.

Thermoplastic heat sealable compositions of wax and elastomer have been very commonly used as heat sealable coatings on the aforementioned materials. Petroleum wax based coatings have been utilized extensively because they are generally safe in contact with food, are low in cost, have good protective properties and heat sealability, and are free from taste and odor. Modifying additives such as natural and synthetic rubbers, resins, polymers and the like may be added to the wax base to alter the physical and protective properties of the coating. For example, a commonly used coating employs a wax base of the microcrystalline type and an added elastomer such as polyisobutylene, with the additive generally being present in the range of 3 to 20% of the total weight of the coating. Such coating adheres well to a flexible substrate such as paper, cellophane, or metal foil, is stable at room temperatures, and heat seals well to the coated or uncoated side of the substrate with a strong seal that inhibits passage of air and moisture.

The wax base surface coatings which have good heat sealing properties are slightly tacky at room temperature and the coated sheets tend to stick together when they are stacked one on top of another or stored in rolls. The sticking of the coated sheets, commonly referred to as "blocking," presents a problem in the handling of the material. A number of techniques have been used to minimize the blocking problem including interleaved release coated sheets, solvent based coatings and slurries, and starch dusting. Various problems have been associated with such coating techniques including the relative high cost of the materials and processing steps required, reduction in the heat sealing qualities or appearance of the wrapper, and handling problems. Starch dusting has been most commonly used for preventing blocking in food wrappers, particularly cheese wrappers, but the starch application weight is hard to control and excess amounts can interfere with the operation of the wrapping machine. Under some circumstances, the starch also has been subject to mold growth with potential mold contamination of the wrapped food product.

SUMMARY OF THE INVENTION

The flexible coated packaging material of the invention includes a substrate of flexible packaging material, a normally tacky heat sealable wax composition coated on a surface of the substrate, and a non-blocking solidified hot melt coating applied over the heat sealable wax composition to a selected thickness which allows the heat sealable layer to penetrate the over coating and provide a firm seal upon heat sealing. The non-blocking coating comprises a solidified petroleum wax composition which is non-tacky, and is applied in a thickness between 1 and 14 pounds per ream (3,000 sq. ft.). Wax material by itself having a melting point in the range of 155° F. to 210° F. provides adequate release properties as well as allowing penetration by the tacky undercoating to provide adequate heat seals at normal heat sealing temperatures in the range of 250° F. to 275° F. The coating composition may further comprise a solidified solution of a lower melting temperature wax with a low density polymer material such as polyethylene or ethylene vinyl acetate, melted and dissolved in the wax base, and present in an amount between approximately 10% and 80% by weight of the overall coating composition. The addition of the polymer resin has been found to have the effect of increasing the cohesion of the coating over that obtained with the wax base alone, as well as maintaining or enhancing the non-blocking surface characteristics of the coating. The polymer also allows better heat seals to be made through the non-blocking layer than are obtained with the wax base alone.

Further objects, features and advantages of the invention will be apparent from the following detailed description describing preferred embodiments of a flexible non-blocking heat sealable packaging material in accordance with the invention.

DESCRIPTION OF THE PREFERRED EMBODIMENTS

The non-blocking coating of this invention can be applied over heat sealable material on many different substrates, including paper, metal foil, or cellophane as well as other substrates which are not affected by the temperatures used to provide the heat seal. The adhesive material is a normally tacky wax composition which is typically coated at a thickness of 20 to 40 pounds per ream (3,000 sq. ft.) on one surface of the substrate. The non-blocking coating is applied as a hot melt over the adhesive coating at an application level between 1 and 14 pounds per ream, or generally in the range of 1/15 mil to ⅜ mil average coating thickness after solidification. The minimum coating thickness is required to sufficiently cover the underlying heat sealable layer, while the maximum thickness allows the coating to dissolve and thoroughly mix with the underlying adhesive coating during heat sealing to yield an adequate heat seal. The non-blocking coating is applied at a temperature at which the composition has a viscosity which allows it to be easily cast from an engraved gravure cylinder. The preferred melt temperature ranges from a minimum of 200° F. to a maximum of 260° F., a temperature above which the underlying adhesive coating would be activitated. While a gravure cylinder is preferably utilized for applying the hot melt to the adhesive coating at a controlled thickness, spraying or other application methods may be utilized.

The principles of the packaging material of the invention may be illustrated with reference to a typical cheese wrapper sheet material composed of a cellophane substrate with a normally tacky heat sealable wax composition coating thereon at 30 lbs. per ream comprising 78% microcrystalline wax, 15% polyisobutylene and 7% petrolatum. As indicated above, the packaging material of the invention may also be formed utilizing other substrates and wax based heat sealable coatings, including those which contain additives such as ethylene vinyl acetate copolymer, butyl rubber, and rosin esters.

The following examples illustrate the composition of the non-blocking coating.

EXAMPLES 1-19

In each of the following examples, the blocking resistance of the non-blocking coating composition applied to the heat sealable cellophane was determined in accordance with the following procedures. Samples of the packaging material were cut to a size of 8 inches by 5 inches and stacked with the coated sides of each sheet facing and contacting the uncoated side of the adjacent sheet. The stack of sheets was placed between ⅛ inch thick sponge rubber mats, a 40 pound weight was placed over the stack, and the entire assembly was placed in an oven at a temperature of 100° F. for 40 hours. The sheets were then removed from the oven and left at ambient temperature (70–80° F.) for approximately 4 hours. The samples were graded by hand peeling the interleaved sheets from one another using a 90° to 180° angle of pull. The following score system was used for the degree of blocking:

E: no blocking, sheets fell apart.
G+: no blocking, very slight adhesion of sheets.
G: no blocking, slight adhesion but sheets can be peeled apart easily.
F+: no blocking, sheets can be peeled apart but sheets tack together at points.
F: some blocking, sheets can be peeled apart with some difficulty.
P: completely blocked, sheets cannot be peeled apart.

The heat sealing tests on the samples set forth below were carried out by placing coated sides of the sheets in face-to-face relationship and applying 20 psi. sealing pressure for one second dwell time at 250° F. If inadequate seal strength was found at the 250° F. sealing temperature, an additional seal was performed at a seal temperature of 275° F. The strength of the seal was measured at ambient temperature by an Instron testing unit on a 1 inch strip of heat sealed material at approximately a 180° tail at a rate of 10 inches per minute.

The constituents of the non-blocking coating composition were melted and thoroughly intermixed at a melt temperature of approximately 280° F. This temperature was sufficient to yield melting of all of the waxes utilized to a free flowing, low viscosity state, as well as allowing the polymer resins set forth below to be readily melted and dissolved in the liquified wax base. The maximum temperature of the melt at time of coating is preferably limited to approximately 250° F. to 260° F. for application to the above described heat sealable coating, since higher melt temperatures may tend to melt and activate the heat sealable coating with a resulting loss of blocking resistance. Each of the non-blocking hot melt coatings was applied at approximately 50 feet per minute utilizing a gravure cylinder in contact with the heat sealable coated substrate, with the thickness of the coating depending upon the gravure cylinder used.

The illustrative non-blocking coating compositions are set forth below in Table 1.

TABLE 1

| Coating Sample | Coating Thickness (lbs/ream) | Coating Composition (percent of total coating weight, m.p. = melting point) |
|---|---|---|
| 1 | 4 | 100% 200°–210° F. m.p. paraffin |
| 2 | 4 | 90% 155° F. m.p. paraffin<br>10% 200°–210° F. m.p. paraffin |
| 3 | 4 | 60% 155° F. m.p. paraffin<br>40% 200°–210° F. m.p. paraffin |
| 4 | 4 | 80% 155° F. m.p. paraffin<br>20% 190°–195° F. m.p. microcrystalline |
| 5 | 4 | 80% 155° F. m.p. paraffin<br>20% 175° F. m.p. microcrystalline |
| 6 | 1 | 90% 155° F. m.p. paraffin<br>10% low density polyethylene (12,000 mol. wt.) |
| 7 | 4 | 90% 155° F. m.p. paraffin<br>10% low density polyethylene (extrusion grade, 3.7 melt index) |
| 8 | 14 | 90% 155° F. m.p. paraffin<br>10% low density polyethylene (extrusion grade, 3.7 melt index) |
| 9 | 4 | 50% 175° F. m.p. microcrystalline<br>40% 155° F. m.p. paraffin<br>10% low density polyethylene (12,000 mol. wt.) |
| 10 | 4 | 70% 155° F. m.p. paraffin<br>20% 195° F. m.p. microcrystalline<br>10% low density polyethylene (12,000 mol. wt.) |
| 11 | 4 | 60% 155° F. m.p. paraffin<br>40% medium density polyethylene (1500 mol. wt.) |
| 12 | 4 | 60% 130° F. m.p. paraffin<br>40% medium density polyethylene (1500 mol. wt.) |
| 13 | 4 | 60% medium density polyethylene (1500 mol. wt.)<br>40% 155° F. m.p. paraffin |
| 14 | 4 | 80% medium density polyethylene (1500 mol. wt.)<br>20% 155° F. m.p. paraffin |
| 15 | 4 | 90% 155° F. m.p. paraffin<br>10% low density polyethylene (30,000 mol. wt.) |
| 16 | 4 | 80% 155° F. m.p. paraffin<br>20% ethylene vinyl acetate (400 melt index, 18% vinyl acetate) |
| 17 | 4 | 80% 155° F. m.p. paraffin<br>20% ethylene vinyl acetate (400 melt index, 28% vinyl acetate) |
| 18 | 4 | 72% 155° F. m.p. paraffin<br>18% 195° F. m.p. microcrystalline<br>10% ethylene vinyl acetate (6 melt index, 28% vinyl acetate) |
| 19 | 4 | 60% 155° F. m.p. paraffin<br>25% ethylene vinyl acetate (500 melt index, 18% vinyl acetate)<br>15% ethylene vinyl acetate (400 melt index, 28% vinyl acetate) |

The results of the seal strength and blocking resistance tests for the coating samples of Table 1 are set forth in Table 2.

TABLE 2

| Coating Sample | Seal Strength (lbs/in) 250° F., 20 psi., 1 sec. dwell | Seal Strength (lbs/in) 275° F., 20 psi., 1 sec. dwell | Blocking Resistance |
|---|---|---|---|
| 1 | 0.5 | 1.2 | E |
| 2 | 1.6 | 0.6 | G |
| 3 | 0.8 | 1.3 | G+ |
| 4 | 2.5 | — | F+ |
| 5 | 1.7 | — | F |
| 6 | 2.0 | — | G |
| 7 | 1.9 | — | G |
| 8 | 1.1 | 0.8 | G |
| 9 | 2.0 | — | F+ |
| 10 | 1.9 | — | G+ |
| 11 | 1.7 | — | E |

TABLE 2-continued

| Coating Sample | Seal Strength (lbs/in) 250° F., 20 psi., 1 sec. dwell | Seal Strength (lbs/in) 275° F., 20 psi., 1 sec. dwell | Blocking Resistance |
| --- | --- | --- | --- |
| 12 | 2.0 | — | G |
| 13 | 2.4 | — | E |
| 14 | 2.1 | — | E |
| 15 | 1.9 | — | F+ |
| 16 | 2.7 | — | G |
| 17 | 2.2 | — | G |
| 18 | 1.7 | — | G |
| 19 | 2.2 | — | G+ |

As shown in Table 1, samples 1–5 comprise coating compositions of wax alone, samples 6–15 are compositions of wax and polyethylene, and samples 16–19 are compositions of wax and ethylene vinyl acetate copolymer.

It is seen that application of a coating of 200°–210° F. melting point paraffin wax alone, as shown in sample 1, provided excellent blocking resistance with an adequate heat seal being obtained at a sealing temperature of 275° F. Samples 2 and 3 are mixtures of 155° F. m.p. paraffin and the high melting point paraffin of sample 1, and the results given in Table 2 demonstrate that the mixtures provide a compromise in the qualities of two waxes, providing adequate resistance to blocking and satisfactory heat seal strength in excess of 1 pound per linear inch. Samples 4 and 5 are mixtures of 155° F. melting point paraffin wax and microcrystalline waxes having a higher melting point, which results in an increase of the melting point of the overall mixture above that of the paraffin wax alone. These wax mixtures are seen to provide adequate seal strength while providing some increase in blocking resistance to marginally acceptable levels.

Samples 6–15 are coating compositions comprising mixtures of wax and polyethylene. The results given in Table 2 demonstrate that mixtures of wax and polyethylene provide uniformly good results in concentrations of polyethylene from 10 to 80% by weight of the overall composition, and at coating thicknesses from 1 pound per ream to 14 pounds per ream.

Samples 16–19 show that ethylene vinyl acetate copolymer may be utilized in mixtures with various waxes with good results similar to those obtained with polyethylene.

As illustrated by the foregoing examples, coatings of wax alone, applied as a hot melt, provide blocking resistance yet allow penetration of the underlying adhesive so that adequate heat seals may be formed. Waxes having melting points of at least 155° F. and not more than approximately 210° F. may be utilized in coating thicknesses from 1 to 14 pounds per ream, with 4 pounds per ream being preferred. Mixtures of waxes with higher and lower melting points, both paraffin and microcrystalline, may be formed to provide a wax composition with a melting point in the desired range.

It is further seen that the addition of polyethylene or ethylene vinyl acetate copolymer to the wax base composition, in amounts from 10% to 80% by weight of the coating, provides very satisfactory combinations of blocking resistance and seal strength. As demonstrated by sample 12, incorporation of the polymer resin in the wax base provides adequate blocking and heat seal strength even where the wax base utilized has a melting point below 155° F. It is believed that the addition of these polymers to the basic wax provides better cohesion of the solidified coating, and improved surface properties which minimize blocking. The addition of the polymer also aids in forming strong heat seals at the relatively low heat sealing temperature of 250° F.

EXAMPLE 20

A sheet of cellophane coated in accordance with the conditions of sample 7 specified above was placed over a forming block, and processed cheese at a 180° F. was poured onto the coated side of the sheet and packed into the block form. The coated sheet was then heat sealed over the cheese in substantially air-tight relation, and the entire package was cooled at 40° F. for a day. The packaging material had a slightly dull appearance, no pockmarks were noted on the packaging material, and upon opening of the package, the coated side of the packaging material released very easily from the cheese with no transfer of the coating to the cheese.

It is understood that the invention is not confined to the particular embodiments included herein as illustrative, but embraces all such modified forms thereof as come within the scope of the following claims.

I claim:

1. A heat sealable packaging material comprising:
   (a) a substrate of flexible packaging material which is not affected by temperatures used to provide wax composition heat seals;
   (b) a layer of normally tacky heat sealable wax composition coated on a surface of said substrate;
   (c) a non-blocking solidified hot melt coating on said heat sealable wax composition at a thickness between 1 and 14 pounds per ream, said non-blocking coating comprising a petroleum wax composition having a melting point between approximately 155° F. and 210° F.

2. The packaging material of claim 1 wherein said non-blocking coating comprises a solidified mixture of a paraffin wax having a melting point of at least 155° F. and microcrystalline wax having a melting point of at least 175° F. and not more than approximately 210° F.

3. The packaging material of claim 1 wherein said non-blocking coating comprises a solidified mixture of a petroleum wax and a polymer resin dissolved therein in an amount between approximately 10% and 80% by weight of said coating, said polymer resin being selected from the group consisting of low and medium density polyethylene and ethylene vinyl acetate copolymer.

4. The packaging material of claim 1 wherein said normally tacky heat sealable wax composition is a solidified hot melt adhesive comprising a mixture of petroleum wax and polyisobutylene.

5. The packaging material of claim 1 wherein said non-blocking coating comprises a solidified mixture of not more than 90% by weight paraffin wax having a melting point of at least 155° F. and not less than 10% by weight of paraffin wax having a melting point between 200° F. and 210° F.

6. The packaging material of claim 1 wherein said non-blocking coating comprises a solidified mixture of not more than 80% by weight paraffin wax having a melting point of at least 155° F. and not less than 20% by weight of microcrystalline wax having a melting point of at least 175° F.

7. A heat sealable packaging material comprising:
   (a) a substrate of flexible packaging material which is not affected by temperatures used to provide wax composition heat seals;

(b) a layer of normally tacky heat sealable wax composition coated on a surface of said substrate;

(c) a non-blocking solidified hot melt coating on said heat sealable wax composition at a thickness between 1 and 14 pounds per ream, said non-blocking coating comprising a solidified mixture of petroluem wax and a polymer resin dissolved therein in an amount between approximately 10% and 80% by weight of said coating, said polymer resin being selected from the group consisting of low and medium density polyethylene and ethylene vinyl acetate copolymer.

8. The packaging material of claim 7 wherein the petroleum wax of said non-blocking coating is a paraffin wax having a melting point between approximately 130° F. and 210° F.

9. The packaging material of claim 7 wherein said petroleum wax of said non-blocking coating comprises a mixture of paraffin wax having a melting point of at least 155° F. and microcrystalline wax having a melting point of at least 175° F.

10. The packaging material of claim 7 wherein said normally tacky heat sealable wax composition is a solidified hot melt adhesive comprising a mixture of petroleum wax and polyisobutylene.

* * * * *